Patented Feb. 24, 1953

2,629,662

UNITED STATES PATENT OFFICE 2,629,662

PROCESS OF TREATING PHOSPHATIDES AND PRODUCT

Percy L. Julian, Maywood, Herbert T. Iveson, Berwyn, and Marian Leichti McClelland, Chicago, Ill., assignors to The Glidden Company, Cleveland, Ohio, a corporation of Ohio No Drawing. Application June 17, 1948, Serial No. 33,684

24 Claims. (Cl. 99—15)

1

The present invention relates to the production of phosphatidic materials of improved emulsifying and surface-active properties and increased water solubility and more particularly relates to a chemical modification of phosphatides to produce these properties and to the new products formed.

It is known that phosphatides, such as soy bean phosphatides, possess both hydrophyllic and lipophillic groups which make them widely used as emulsifying agents or surface active agents. As the phosphatides occur in nature and are separated commercially, however, the lipophillic properties are emphasized to such a degree that much of their potential effectiveness as emulsifying agents is not realized. It is therefore highly desirable to produce phosphatidic materials which possess a more satisfactory balance of hydrophyllic and lipophyllic properties for emulsification uses and thereby produce phosphatides of superior emulsifying properties.

It is accordingly an object of the present invention to produce phosphatides of improved emulsifying properties.

Another object is to modify the hydrophyllic-lipophillic balance of phosphatides to improve the emulsifying properties thereof.

A further object is to increase the hydrophillic properties of phosphatides.

Still another object is to increase the water solubility of phosphatides.

An additional object is to provide a process for accomplishing the foregoing objects.

It has been found that the above objects may be attained by treating the phosphatides under conditions which bring about hydroxylation of the phosphatide. Phosphatides have the general formula

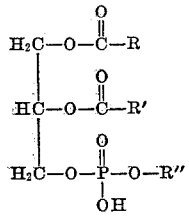

where R and R' are the hydrocarbon radicals of the higher fatty acids, some of which are unsaturated and R" is either a choline radical, a cholamine radical or a serine radical. The phosphate radical may occupy either the α or β position. In the lecithins, R" is the choline radical, and in the cephalines R" is the cholamine radical.

It has been found that hydroxylation of such molecules at a double bond of the unsaturated

2 fatty acids can be accomplished by treating the phosphatides with hydrogen peroxide, preferably in the presence of a water-soluble aliphatic carboxylic acid, or with the peracids of such water-soluble aliphatic carboxylic acids. As indicated, it is preferred to treat either with a mixture of hydrogen peroxide and acid or with the peracid since the reaction is more economical and a greater degree of hydroxylation can be obtained. However, hydrogen peroxide alone produces beneficial results. When acid conditions are employed, it is preferred not to use such an amount as will result in a pH value below 3 for a 1% aqueous solution of the mixture, since the phosphatides are easily decomposed under severe acid conditions. Greater amounts of acid may be used, however, where a greater degree of hydroxylation and water solubility are desired, although there is the danger of some decomposition taking place.

The resulting product has a decreased unsaturation as measured by the iodine value, indicating hydroxylation. It has not been possible, however, to directly measure the hydroxyl groups, since the conditions for such measurement result in decomposition of the phosphatide. However, the product has been hydrolyzed and acetyl values determined on the fatty acids recovered. These show a substantial increase in acetyl values over the acids recovered from the untreated phosphatides, and clearly indicate that hydroxylation occurs on the fatty acid portion. Dihydroxystearic acid has also been recovered from the hydrolysate of the treated material.

The following illustrative equation is postulated as representing one reaction which may take place when acidic conditions are employed.

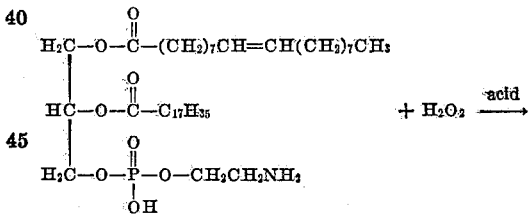

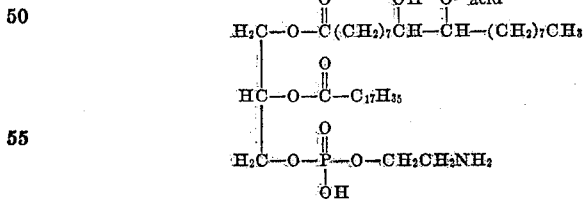

It has been commercial practice to keep the acidity of phosphatide products at a low level, so that even though the acidic product is thoroughly satisfactory, it is preferred to neutralize the product so that the pH of a 1% water solution is between 6 and 7. This is conveniently done by adding caustic soda in water solution to neutralize the acid. Other alkalies, however, may be used, although those of divalent metals such as Ca, Mg, etc. give somewhat inferior properties. Also neutralization may be effected with alcohols such as methanol, ethanol, etc.

The acids which may be used are formic, acetic, lactic, citric, tartaric, peracetic, perlactic, and the like. The acids are preferably of relatively high concentrations since the lower concentrations add to the drying problem. The amount of acid added is preferably equivalent to about one-half of the hydroxyl groups formed. However, increasing the amount of hydrogen peroxide for a given amount of acid results in some increase in the amount of hydroxyl groups formed. Lactic acid is preferred where the product is for edible purposes.

The amount of hydrogen peroxide governs the amount of hydroxylation and can be varied to produce the desired amount of hydroxylation. About 14% of 100 volume $H_2O_2$ has been found desirable for producing about a 10% reduction in the iodine value, although amounts as low as 0.5% and as high as 45% have been used. The use of larger amounts of hydrogen peroxide, either with or without acid present, increases the degree of hydroxylation. Also higher concentrations of equivalent amounts of hydrogen peroxide increases the degree of hydroxylation somewhat due to increased efficiency.

In some instances, it may be desirable to produce increased hydroxylation by a repetition of the process instead of by using more severe conditions and a single treatment. High concentrations of hydrogen peroxide tend to cause decomposition of the phosphatide and by repeating the treatment using low or moderate hydrogen peroxide concentrations, it is possible to produce higher degrees of hydroxylation with less danger of decomposition than if the same degree of hydroxylation were attempted in a single treatment.

The reaction may be carried out at elevated temperatures, but for best efficiency in the use of the treating agent, the temperature should not be above 40° C. Higher temperatures are faster but result in less efficient use of the reagents. The temperature should, of course, be kept below the decomposition temperature of the phosphatides, which for soy bean phosphatides is normally about 75° C.

Mixtures of phosphatides, phosphatide mixtures with fatty material, or essentially pure phosphatides such as lecithin and cephalin, or emulsions thereof, may be treated. The phosphatides may be of animal or vegetable origin. Most commercial phosphatides are obtained from soy beans or corn oil, and either of these is quite satisfactory for use according to the present invention. Crude soy bean phosphatides, composed of about 35% soy bean oil and approximately equal parts of lecithin and cephalin, have been treated according to the present invention with excellent results. Analysis of such treated material shows that both phosphatide fractions are hydroxylated as well as the oil portion. This hydroxylation of the oil portion is beneficial in that its hydrophyllic properties are also increased, thereby increasing the emulsifying and surface-active characteristics of the mixture over what they would be if the oil were not hydroxylated.

It has also been found that hydroxylation of lecithin decreases its solubility in ethyl alcohol. Thus, where lecithin itself is hydroxylated and washed with ethyl alcohol, the hydroxylated portion is now insoluble and upon its removal the material remaining in solution has approximately the same iodine value as the original lecithin.

The degree of hydroxylation may vary over a considerable range. We have been able to hydroxylate crude soy bean phosphatides to an iodine value of 30, a reduction of about 70%. Some decomposition occurs, however, and hydroxylation greater than indicated by a reduction in iodine value of about 50% should ordinarily be avoided. The higher degrees of hydroxylation, moreover, are not desirable for many purposes, since the hydrophyllic properties have been so greatly enhanced as to make them predominant. However, where such products may be desirable these higher degrees of hydroxylation can be effected. We have found that for most emulsification purposes, the degree of hydroxylation need not exceed about 20–25%. In most of our work, we have found that about 10% hydroxylation is not only economically practical but that the product is highly suited for use as emulsifying and surface-active agents in various food products such as ice cream and other frozen confections, margarine, baked goods, etc., to produce improved effects of the kinds which known emulsifying and surface-active agents impart to such products. The minimum degree of hydroxylation for practical results should be about 5% as measured by the reduction in iodine value. We have made such products which possess greatly enhanced emulsifying and surface-active properties over the untreated material. A comparison of the emulsifying properties for varying degrees of hydroxylation of crude soy bean phosphatides, having an initial iodine value of about 100, shows that the emulsifying property as tested in straight oil and water emulsions increases in a straight line relationship to the reduction in iodine value until an iodine value of about 78 is reached, when the curve levels off. There is then a slight decrease in emulsifiability until the iodine value is reduced to about 45–50 when the emulsifiability decreases rapidly. Where, however, the hydroxylated materials are used in more complex systems which may be modified by other chemicals and conditions, it may be found that different degrees of hydroxylation will be more desirable, depending upon the particular conditions. The water solubility, however, increases in a substantially straight line relationship with the decrease in iodine value.

As previously indicated, it is preferred to use the substantially neutral hydroxylated phosphatides. However, the partially or completely esterified materials may be used, whether initially formed or subsequently esterified. However, the hydrophyllic properties of the esterified material are not as great as for the corresponding unesterified material. In most cases, therefore, it is expedient to only carry out the hydroxylation to the point where the unesterified material has the desired emulsifying and surface-active properties.

It is convenient to incorporate the various reagents and catalyst in aqueous solution. For commercial usage of the product, however, it is preferable to dry the product to a moisture content not exceeding about 1%. The drying should be below the decomposition temperature of about 75° C. and therefore vacuum drying is preferred.

The following examples are illustrative of the invention.

EXAMPLE 1

100 grams of crude soybean lecithin, having an iodine value of 95.7, was warmed to approximately 50° C., at which temperature it melts. 3 grams of 75% lactic acid were added and mixed in and 14 grams of 100 volume $H_2O_2$ were added slowly with agitation while maintaining the temperature at 50° C. This mixture was stirred for one hour at 50° C. and then dried under a vacuum of 27.5 inches until the moisture content was less than 1%. The iodine value of the resulting material was 84.0. This material is easily emulsified in water and is a very effective emulsifying agent.

EXAMPLE 2

2500 grams of lecithin emulsion and 35.5 grams of 75% lactic acid were mixed together, and 175 grams of 100 volume $H_2O_2$ was added slowly over a period of 30 minutes. The emulsion was then stirred for one hour and dried under vacuum until it became liquid. At this point 47 grams of a 10% sodium hydroxide solution was added slowly and the temperature controlled so that it did not go above 70° C. The drying was then continued until the moisture content was less than 1%. This material had an iodine value of 84 and showed greatly improved properties as an emulsifying agent.

EXAMPLE 3

Soybean phosphatides from which the soybean oil had been removed by exhaustively washing with acetone and which had an iodine value of 87.5 were mixed with 3% of 75% lactic acid. 14% of 100 volume $H_2O_2$ was then added slowly to the mixture and the whole warmed to approximately 50° C. and stirred for 1 hour. The mixture was then dried under vacuum and the resulting product showed an iodine value of 79.

EXAMPLE 4

Hydroxylated crude lecithin as prepared in Example 1 was washed with acetone until the oil had been completely removed. The acetone was removed from both portions under vacuum. The phosphatide portion had an iodine value of 73, whereas the regular untreated phosphatide portions have an iodine value of 85 or more.

The oil portion had an iodine value of 112 where the normal value for oil prepared by washing crude soybean phosphatides with acetone is 122.

EXAMPLE 5

495 pounds of crude soybean lecithin was warmed to 55° C. with mixing. 15 pounds of 75% lactic acid was added and 70 pounds of 100 volume hydrogen peroxide was added slowly over a period of 30 minutes. The mixture was stirred for one hour and then dried under vacuum until it became liquid.

6.5 pounds of flake caustic in a 10% water solution was added and stirred in well. This mixture was then dried under vacuum. 528 pounds of finished material was obtained having an iodine value of 85.3 and exhibiting superior emulsifying properties.

EXAMPLE 6

A sample of crude soybean phosphatides was divided into aliquot parts. One portion was treated with 3% of 75% lactic acid and 14% of 100 volume $H_2O_2$ for 1 hour at 60° C., the reagents being added at room temperature. Another portion was treated with 3% of 50% peracetic acid at 60° C. for 1 hour. The treated portions were then dried and neutralized. The untreated phosphatides and the dried treated samples were then washed with acetone to extract the oils and the phosphatidic material separated by their difference in solubility in ethyl alcohol. Iodine values on the starting material as well as all of the fractions and dried reaction products were determined with the following results.

| Material | none | Treatment | |
|---|---|---|---|
| | | $H_2O_2+C_3H_6O_3$ | peracetic acid |
| Oil-phosphatide mixture | 100.5 | 93.0 | 89.3 |
| Oil | 136.8 | 133.5 | 117.1 |
| Phosphatide mixture | 80.7 | 72.2 | 70.8 |
| EtOH soluble | 89.5 | 88.8 | 80.4 |
| EtOH insoluble | 63.3 | 56.6 | 60.9 |

These results appear to indicate that the peracetic acid hydroxylated all portions more or less equally. The hydrogen peroxide-lactic acid treatment appears not to effect as high a degree of hydroxylation of the oil fraction, but does hydroxylate the phosphatide portion about the same. It would appear, however, in this case that most of the hydroxylation was on the cephalin (alcohol insoluble) fraction.

EXAMPLE 7

In order to check some of the results obtained in Example 6, the lecithin and cephalin fractions from the untreated crude were hydroxylated by both methods and the iodine values were found to be as follows:

| Material | $I_2$ Value |
|---|---|
| Lecithin fraction—original | 80.7 |
| Lecithin fraction—$H_2O_2+C_3H_6O_3$ | 72.4 |
| Lecithin fraction—peracetic acid | 75.9 |
| Cephalin fraction—original | 62.3 |
| Cephalin fraction—$H_2O_2+C_3H_6O_3$ | 58.4 |
| Cephalin fraction—peracetic acid | 53.3 |

The treated lecithin fractions were then washed with alcohol, whereupon a precipitate formed. Upon removal of the precipitate, the iodine value of the remaining soluble material was found to be substantially the same as before treatment.

It therefore appears that hydroxylation takes place on all fractions containing unsaturated fatty acids groups and that the hydroxylated phosphatides are insoluble in ethanol, and therefore appear with the cephalin fraction upon a separation of the treated crude phosphatides.

EXAMPLE 8

A portion of a sample of crude soybean phosphatides having an iodine value of 100.1 was treated with 3% of 50% peracetic acid to an iodine value of 89.3. Another portion was treated with 14% of 100 volume hydrogen peroxide and 3% of 75% lactic acid to a comparable iodine value of 89.2. These, as well as another portion of the crude phosphatides, were then hydrolyzed by refluxing 50 g. samples overnight with 10% HCl solution in methanol. The alcohol was removed by distillation and the residues taken up in ether and washed with water, dried and acetyl values obtained on the fatty acids with the following results.

| Material | I₂ Value | Acetyl Value |
|---|---|---|
| Crude | 100.1 | 7.5, 7.6 |
| Peracetic | 89.3 | 33.2, 34.1 |
| H₂O₂+C₃H₆O₃ | 89.2 | 37.8, 37.9 |

These results clearly show that hydroxylation has taken place on the fatty acid portion.

EXAMPLE 9

*Preparation and identification of dihydroxystearic acid*

Hydroxylated lecithin was hydrolyzed by refluxing with alcoholic hydrochloric acid and then taken up in ether. The ether solutions were washed with dilute alkali and water and dried and concentrated to dryness. 17 grams of the methyl ester of the fatty acids thus obtained from the hydroxylated lecithin were dissolved in 100 cc. of pyridine and 6 grams of succinic anhydride. The mixture was heated on a steam bath for 2 hours and then poured into a mixture of hydrochloric acid and ice. This mixture was extracted and the ether solution washed with water and then extracted with a 10% Na₂CO₃ solution. This solution was acidified and extracted with ether. The ether extracts were washed with water, dried and concentrated to dryness. The residue was treated with 10% NaOH and taken up in ether. The ether solutions were washed free of alkali, dried and concentrated. The concentrate was made acid and extracted with ether. The ether solutions were washed, dried and concentrated. This concentrate was crystallized from 95% EtOH giving crystals which melted at 120–123° C. On recrystallization from alcohol crystals were obtained melting at 131° C. A melting point of a mixture of pure dihydroxystearic acid and this material gave the value of 130–132° C.

EXAMPLE 10

Portions of crude soybean phosphatides having an iodine value of 98.7 were treated with various amounts of 100 volume hydrogen peroxide and 75% lactic acid, these being added in increments over a thirty-minute period. The mixtures were allowed to stand at room temperature for one hour, after which the materials were vacuum dried and neutralized as in Example 2. The iodine values of the products were then determined with the following results.

| Experiment | Percent H₂O₂ | Percent C₃H₆O₃ | I₂ Value |
|---|---|---|---|
| 1 | 3 | 14 | 88 |
| 2 | 10 | 14 | 83 |
| 3 | 3 | 20 | 87 |
| 4 | 3 | 30 | 85 |
| 5 | 3 | 40 | 75 |

The results show that increasing the amount of H₂O₂ and holding the lactic acid constant results in an increased reduction in the iodine value and that holding the H₂O₂ constant and increasing the lactic acid likewise produces lower iodine values.

EXAMPLE 11

Soybean oil miscella containing some residual hexane was steamed to remove the hexane and precipitate an emulsion of crude soybean phosphatides. Portions of this emulsion were then treated with various portions of 100 volume H₂O₂ and 75% lactic acid, the treatment being at 60° C. for 3 hours. After drying, iodine values were determined as follows:

| Experiment | Percent H₂O₂ | Percent C₃H₆O₃ | I₂ Value |
|---|---|---|---|
| 1 | 3 | 14 | 86.3 |
| 2 | 10 | 14 | 77.8 |
| 3 | 10 | 25 | 72.8 |
| 4 | 15 | 25 | 71.6 |
| 5 | 30 | 45 | 53.6 |

The amount of treating material in Experiment 5 was theoretically sufficient to produce a zero iodine value. This material was dark in color and showed some decomposition.

EXAMPLE 12

1100 parts of a crude soybean emulsion containing approximately 47% water was warmed in a vacuum kettle to 50° C. and 15 parts of 75% lactic acid and 73.5 parts of 100 volume H₂O₂ added over a half-hour period. The mixture was then agitated for two and one-half hours at 50° C. The material was then dried under vacuum until it became fluid. Seven parts of caustic soda, as a 10% aqueous solution, was then added and the drying continued under vacuum at a temperature not exceeding 75° C. until the moisture content was below 1%. There was obtained 550 parts of material having an iodine number of 94.5, as compared to an iodine number of 100 for a dried but untreated sample of the original emulsion. This product possessed considerably enhanced emulsifying power over the untreated material but was not as good as when there is a reduction in iodine value of, say, 10 or 20.

EXAMPLE 13

To crude soybean phosphatides was slowly added 6% of tartaric acid in aqueous solution and 14% of 100 volume H₂O₂ over a thirty-minute period. The mixture was allowed to stand for one hour. The emulsion was then vacuum dried until it became liquid when 1.87% of caustic soda as a 10% aqueous solution was added and the vacuum drying continued at a temperature not exceeding 70° C. The iodine value of the dried material was 77 as compared with 100 for the untreated material. The product possessed greatly improved emulsifying properties.

EXAMPLE 14

The treatment was the same as in Example 13 except that 6% of citric acid was used in place of tartaric. The iodine number of the product was 82.7 and it possessed greatly improved emulsifying properties.

EXAMPLE 15

(a) To 200 grams of crude soybean emulsion was added 5 grams of soy fatty acids and 14% of 100 volume H₂O₂ over a 30-minute period. The mixture was allowed to stand for one and one-half hours at room temperature. The dried and caustic soda neutralized material showed no increased emulsifying powers.

(b) The treatment was the same as in (a) except that 6 grams of formic acid was added and the time of treatment was two hours. The dried and neutralized product showed greatly improved emulsifying properties.

EXAMPLE 16

To crude soybean phosphatides having an iodine value of 100.1 was added 14% of 100 volume $H_2O_2$. The mixture was then mixed at approximately 60° C. for 1 hour and dried under vacuum. The dried product had an iodine value of 84 and possessed improved emulsifying power. The acetyl value of the acids obtained on hydrolysis of the product was 17, as compared to 7.5 for the acids of the starting material. A repetition of the treatment on the hydroxylated material of iodine value 84 gave a product having an iodine value of 80.8.

EXAMPLE 17

Crude soybean phosphatides were hydroxylated to an iodine value of 84.3, using 14% of 100 volume $H_2O_2$ and 3% of 75% lactic acid. Upon repeating the treatment, the product had an iodine value of 81.5.

The foregoing examples are illustrative only and are intended to indicate variations in the invention which may be made. Many other variations, however, may be employed to produce the same or different degrees of hydroxylation, emulsifying properties and water solubility. It will therefore be apparent that many modifications may be made without departing from the spirit of the invention.

Having described the invention, what is claimed is:

1. The process which comprises treating under aqueous conditions a phosphatide possessing unsaturated fatty acid radicals under hydroxylating conditions with an agent selected from the class consisting of mixtures of hydrogen peroxide and edible, water-soluble lower hydroxy carboxylic acid and peracids of said hydroxy carboxylic acids in sufficient amounts and for a time and at a temperature below the decomposition temperature of the phosphatide until the iodine value has been reduced from 5 to 25%, the amount of acid being such that the acidity of a 1% aqueous solution is not less than 3, and drying the product at a temperature below the decomposition temperature of the product.

2. The process of claim 1 in which the phosphatide is a soybean phosphatide.

3. A phosphatidic product comprising esters of edible water-soluble lower hydroxy carboxylic acids and hydroxylated phosphatides, said hydroxylated phosphatides having an iodine value from 5% to 25% lower than the corresponding unhydroxylated material, and said phosphatidic product being further characterized by possessing improved emulsifying properties attributable to the presence therein of water-soluble lower hydroxy carboxylic acid ester radicals.

4. A phosphatidic product comprising esters of lactic acid and hydroxylated phosphatides, said hydroxylated phosphatides having an iodine value from 5% to 25% lower than the corresponding unhydroxylated material, and said phosphatidic product being further characterized by possessing improved emulsifying properties attributable to the presence therein of lactic acid ester radicals.

5. A composition of matter comprising a mixture of a dihydroxyphospholipid with a glyceride oil, both ingredients of the mixture characterized by the presence of the grouping

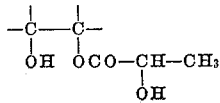

6. A composition of matter particularly adapted for use as an edible emulsifying agent comprising a mixture of polyhydroxylated phospholipid with polyhydroxylated glyceride oil, the said phospholipid and the said glyceride oil in said composition being characterized by having in at least one fatty acid radical of each of the grouping:

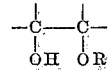

where R is an acyl radical of a water-soluble, lower hydroxy carboxylic acid, the hydroxylated phospholipid in said composition having a sufficient quantity of said groups in the fatty acid radicals thereof to give the resultant phospholipid an iodine value from 5% to 25% lower than that of the same phospholipid not possessing said groupings but which contains an equivalent number of unsaturated carbon-to-carbon bonds.

7. A polyhydroxylated phospholipid particularly adapted for use as an edible emulsifying agent, said phospholipid being characterized by having in at least one fatty acid radical thereof the grouping:

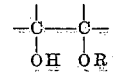

where R is an acyl radical of a water-soluble, lower hydroxy carboxylic acid, the phospholipid having a sufficient quantity of said groups in the fatty acid radicals thereof to give the resultant phospholipid an iodine value from 5% to 25% lower than that of the same phospholipid not possessing said groupings but which contains an equivalent number of unsaturated carbon-to-carbon bonds.

8. A composition as claimed in claim 7 wherein the polyhydroxylated phospholipid is derived from the alcohol-insoluble moiety of soy phosphatides.

9. A composition as claimed in claim 8 wherein R is the acyl radical of lactic acid.

10. A composition as claimed in claim 7 wherein the polyhydroxylated phospholipid is derived from the alcohol-soluble moiety of soy phosphatides.

11. A composition as claimed in claim 10 wherein R is the acyl radical of lactic acid.

12. A phosphatidic product comprising esters of tartaric acid and hydroxylated phosphatides, said hydroxylated phosphatides having an iodine value from 5% to 25% lower than the corresponding unhydroxylated material, and said phosphatidic product being further characterized by possessing improved emulsifying properties attributable to the presence therein of tartaric acid ester radicals.

13. The process for hydroxylating and esterifying phosphatides to improve the emulsifying properties thereof, which comprises treating a phosphatide possessing unsaturated fatty acid radicals under hydroxylating conditions with at least one agent selected from the class consisting of a mixture of hydrogen peroxide and edible, water-soluble, lower hydroxy carboxylic acid, and peracid formed from a mixture of hydrogen peroxide and edible, water-soluble, lower hydroxy carboxylic acid, in sufficient amount and for a time and at a temperature below the decomposition temperature of said phosphatides to produce a substantial reduction in the iodine value of said phosphatides.

14. The process which comprises treating a phosphatide possessing unsaturated fatty acid radicals under hydroxylating conditions with at least one agent selected from the class consisting of a mixture of hydrogen peroxide and edible, water-soluble lower hydroxy carboxylic acid and peracid formed from a mixture of hydrogen peroxide and edible, water-soluble, lower hydroxy carboxylic acid, in sufficient amount and for a time and at a temperature below the decomposition temperature of said phosphatides to produce a phosphatidic product having an iodine value from 5 to 25% lower than that of the starting phosphatide.

15. The process of claim 14 in which the treating agent is a mixture of hydrogen peroxide and edible, water-soluble lower hydroxy carboxylic acid.

16. The process of claim 15 in which the treating agent is a mixture of hydrogen peroxide and lactic acid.

17. The process of claim 16 in which the phosphatide is a soybean phosphatide.

18. The process as claimed in claim 17 wherein the phosphatide is the alcohol-soluble moiety of soya phosphatides.

19. The process as claimed in claim 17 wherein the phosphatide is the alcohol-insoluble moiety of soya phosphatides.

20. The process of claim 14 in which the treating agent is a peracid formed from a mixture of hydrogen peroxide and edible, water-soluble lower hydroxy carboxylic acid.

21. The process of claim 20 in which the treating agent is perlactic acid formed from a mixture of hydrogen peroxide and lactic acid.

22. The process of claim 21 in which the phosphatide is a soybean phosphatide.

23. The process of claim 22 in which the phosphatide is the alcohol-soluble moiety of soybean phosphatides.

24. The process as claimed in claim 22 in which the phosphatide is the alcohol-insoluble moiety of soybean phosphatides.

PERCY L. JULIAN.
HERBERT T. IVESON.
MARIAN LEICHTI McCLELLAND.

REFERENCES CITED

The following references are of record in the file of this patent:

UNITED STATES PATENTS

| Number | Name | Date |
|---|---|---|
| 2,204,109 | Thurman | June 11, 1940 |
| 2,249,002 | Julian et al. | July 15, 1941 |
| 2,299,743 | Epstein | Oct. 27, 1942 |
| 2,445,948 | Wittcoff | July 27, 1948 |
| 2,513,638 | Glabe | July 4, 1950 |